(12) United States Patent
Poukka et al.

(10) Patent No.: US 12,331,460 B2
(45) Date of Patent: Jun. 17, 2025

(54) METHOD OF REPLACING SODIUM LOSSES IN A PULP MILL, A METHOD OF PRODUCING BLEACHED CELLULOSIC PULP, AND A SYSTEM

(71) Applicants: Metsä Fibre Oy, Metsä (FI); Andritz Oy, Helsinki (FI)

(72) Inventors: Ari Poukka, Metsä (FI); Veli-Pekka Tervola, Helsinki (FI)

(73) Assignees: Metsä Fibre Oy, Metsä (FI); Andritz Oy, Helsinki (FI)

( * ) Notice: Subject to any disclaimer, the term of this patent is extended or adjusted under 35 U.S.C. 154(b) by 669 days.

(21) Appl. No.: 17/430,737

(22) PCT Filed: Feb. 13, 2020

(86) PCT No.: PCT/FI2020/050092
§ 371 (c)(1),
(2) Date: Aug. 13, 2021

(87) PCT Pub. No.: WO2020/165504
PCT Pub. Date: Aug. 20, 2020

(65) Prior Publication Data
US 2022/0106737 A1    Apr. 7, 2022

(30) Foreign Application Priority Data

Feb. 13, 2019    (FI) ...................................... 20195108

(51) Int. Cl.
*D21C 11/00*    (2006.01)
*D21C 9/14*    (2006.01)

(52) U.S. Cl.
CPC .......... *D21C 11/0078* (2013.01); *D21C 9/142* (2013.01); *D21C 11/0057* (2013.01)

(58) Field of Classification Search
CPC .. D21C 11/0078; D21C 9/142; D21C 11/0057
See application file for complete search history.

(56) References Cited

U.S. PATENT DOCUMENTS

| 4,098,639 A | 7/1978 | Noreus et al. |
| 5,302,246 A | 4/1994 | Nykanen et al. |
| (Continued) | | |

FOREIGN PATENT DOCUMENTS

| CN | 1051953 A | 6/1991 |
| CN | 104603357 A | 5/2015 |
| (Continued) | | |

OTHER PUBLICATIONS

Alajoutsajärvi: Replacing Sulfuric Acid in Pulp Bleaching With Internally Formed Organic Acids, MSc Thesis, 2015.
(Continued)

*Primary Examiner* — Jacob T Minskey
*Assistant Examiner* — Stephen M Russell
(74) *Attorney, Agent, or Firm* — Laine IP Oy

(57) ABSTRACT

According to an example aspect of the present invention, there is provided a method of replacing with sodium make-up chemicals sodium losses caused by outflows in a pulp mill which employs a kraft process for producing cellulosic pulp, wherein the pulp mill includes a unit for conversion of sulphurous compounds, which is fed with sulphurous substances of the kraft process to convert said sulphurous substances into oxidized sulphurous compounds, said method comprising using sodium sulphate possibly together with other sodium salts as the main make-up chemical, to achieve an essentially sodium hydroxide free feed of sodium make-up chemicals, and at least a part of the sulphur contained in the sodium sulphate make-up chemical being used for producing oxidized sulphurous compounds in said unit for conversion of sulphurous compounds.

20 Claims, 1 Drawing Sheet

(56) References Cited

U.S. PATENT DOCUMENTS

| | | | |
|---|---|---|---|
| 5,549,788 A * | 8/1996 | Nykanen | D21C 11/12 |
| | | | 162/DIG. 8 |
| 5,984,987 A * | 11/1999 | Kohl | C10K 1/101 |
| | | | 48/209 |
| 2011/0067829 A1 * | 3/2011 | Foan | D21C 3/02 |
| | | | 162/239 |

FOREIGN PATENT DOCUMENTS

| | | |
|---|---|---|
| CN | 104937166 A | 9/2015 |
| CN | 107660245 A | 2/2018 |
| EP | 0543135 A1 | 5/1993 |
| EP | 0946408 A1 | 10/1999 |
| FI | 94266 B | 4/1995 |
| JP | S5215602 A | 2/1977 |
| RU | 2071519 C1 | 1/1997 |
| RU | 2091298 C1 | 9/1997 |
| RU | 2413809 C2 | 3/2011 |
| RU | 2570710 C2 | 12/2015 |
| WO | WO7900899 A1 | 11/1979 |
| WO | WO9412720 A1 | 6/1994 |
| WO | WO9506775 A1 | 3/1995 |
| WO | WO22004025020 A1 | 3/2004 |
| WO | WO2011067829 A1 | 6/2011 |
| WO | WO2014076361 A1 | 5/2014 |
| WO | WO2015010179 A1 | 1/2015 |
| WO | WO2015150626 A1 | 10/2015 |
| WO | WO2018197753 A1 | 11/2018 |

OTHER PUBLICATIONS

Cover page and table of contents of the work containing reference "Valeur et al: Kraft Pulp Mill Internal Sulphuric Acid Production", 2000.

Saturnino: Modeling of Kraft Mill Chemical Balance. PhD thesis, 2012.

Valeur et al: Kraft Pulp Mill Internal Sulphuric Acid Production. Tappi International Environmental Conference, 2000, vol. B, pp. 269-292.

Valmet: Control of sulfidity in a modern kraft pulp mill. Valmet Technical Paper Series, May 26, 2017

Valmet: Production of Sulfuric Acid from Incineration of Pulp Mill Non-Condensable Gases—a Biorefinery Concept. Valmet Technical Paper Series, Oct. 28, 2018, pp. 1-7.

Zhan: Pulping principles and engineering. China Light Industry Press, Jan. 2010, Third Edition, p. 346.

Zhang et al: Research on intelligent control and distribution of production logistic in forest-pulp-paper enterprise. Beijing Institute of Technology Press, Mar. 2018, p. 41.

* cited by examiner

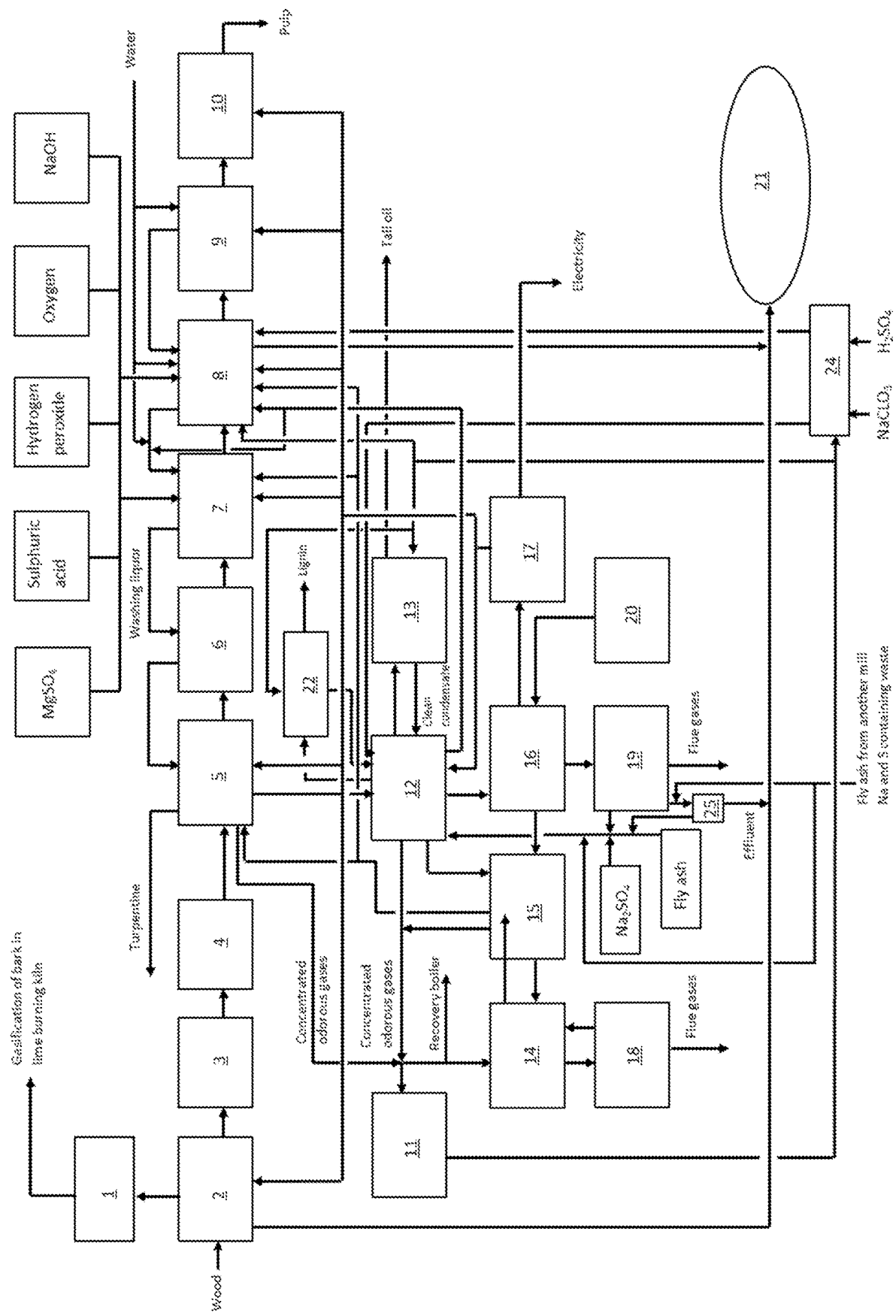

METHOD OF REPLACING SODIUM LOSSES IN A PULP MILL, A METHOD OF PRODUCING BLEACHED CELLULOSIC PULP, AND A SYSTEM

FIELD

The present invention relates to controlling of sodium/sulphur balance in a pulp mill. Particularly, the present invention relates to handling sodium losses in a pulp mill producing Kraft pulp.

BACKGROUND

Pulp Mill and Pulping Steps

A pulp mill produces pulp from wood chips. The obtained pulp can be later used in paper or paperboard manufacturing.

A typical pulp mill is a combination of many different units and operations for actually manufacturing pulp and also for producing valuable side streams.

The first step of a pulping process is the cooking (the main delignification step) of wood chips in a digester in an alkaline environment at a high temperature. The cooking liquor, the so-called white liquor mainly consists of NaOH and $Na_2S$. During this delignification step, fibres are released and lignin extracted. The white liquor becomes black liquor, which has a dark brown colour.

The next step is washing; the spent cooking liquor is washed away, and the wash water is returned to the digester and eventually to an evaporation plant. At this stage the pulp is unbleached.

To obtain a higher brightness, the pulp is led to a bleaching stage. Oxygen delignification may precede the bleaching stages in order to reduce the lignin content before the start of the actual bleaching. Different bleaching sequences and chemicals are in use. Elemental chlorine free (ECF) bleaching processes rely on the use of chlorine dioxide as a bleaching agent. Also hydrogen peroxide and other chemicals not containing chlorine, such as oxygen or sodium hydroxide, can be used for bleaching the pulp.

The various stages of the bleaching processes are referred to with acronyms such as A, Z, D, E, EO, EOP, P and PO stages. Here E refers to the use of NaOH extraction, O to the use of oxygen and P to the use of peroxide. A is an acid hydrolysis stage, Z is ozone stage, and D stage employs $ClO_2$.

The pulp mill includes a black liquor evaporation plant and a recovery boiler, which are used for concentrating the spent cooking liquor coming from the digester and possibly from a washing plant, and for firing the concentrate, respectively. The solid output of the boiler, the smelt, which mainly consists of $Na_2CO_3$ and $Na_2S$, is led to recausticizing, to be causticized by CaO, to recover NaOH and $Na_2S$. The solids from the recausticizing (mainly $CaCO_3$) are fired in a lime kiln to recover CaO, to be recycled back to the recausticizing. In this way the valuable cooking chemicals can be recovered and returned to the digester. The recovery boiler also outputs fly ash, which is composed mainly of sodium sulphate and sodium carbonate and smaller amounts of potassium and chlorine salts. The fly ash is collected from the flue gases by using electrostatic precipitators (ESPs) to reduce emissions.

Na/S Balance and Accumulation of K and Cl

In the early years of pulp manufacturing by the Kraft process, sodium sulphate was an important make-up chemical for the reason that sulphur emissions and leakages from the mills to air and waters were high. The name of the process, "sulphate process", comes from the sodium sulphate make-up chemical. Since then, pulp mills have become more closed systems in order to comply with strict environmental regulation of effluents.

At present, pulp mills have succeeded in better closing the chemical cycle and significantly reducing sulphur leakages and even eliminating them. Therefore, sulphur, as well as potassium and chloride, which mainly arrive in the mill in wood and chemicals, tend to accumulate in the chemical cycle of the mill. Removal of chemicals containing S, K and Cl from the chemical cycle typically leads to simultaneous Na losses, and such losses have proven to be more difficult to reduce and control. This has led to a situation in which the most important make-up chemicals are intended for compensating the sodium losses.

For example, as sulphur is removed from the chemical cycle by dumping fly ash, a certain amount of Na, K and Cl also becomes removed, which leads to an undesired Na outflow.

Sources of Na

Sodium is typically brought to the chemical cycle via the chlorine dioxide plant, which uses $NaClO_3$ as a raw material, and via the make-up NaOH. Also wood contains some sodium.

Sources of S

Sulphur is mainly brought to the chemical cycle in the form of chemicals, such as sodium sulphate, magnesium sulphate and sulphuric acid. In the oxygen delignification and hydrogen peroxide stages, magnesium sulphate may be used. In the tall oil plant, sulphuric acid is fed. Sulphuric acid is also used in various stages for controlling pH. Spent acid outputted from the chlorine dioxide plant contains sulphur.

Losses

One of the main losses of sodium and sulphur is the ESP (electrostatic precipitator) ash (fly ash), purged from the recovery boiler. Such purging is carried out for the purpose of controlling the sulfidity of white liquor or for controlling the chlorine and potassium content in the recovery boiler. The ash contains high amounts of sodium sulphate, sodium carbonate and smaller amounts of salts containing chlorine and potassium. Other losses from the pulp mill are screening rejects, lime mud losses, lime kiln dust, washing losses as the pulp enters bleaching steps, and dregs and grits from the recausticizing plant.

Controlling the Na/S Balance and Accumulation of K and Cl

Typically the Na/S/K/Cl balance is controlled for example by dumping recovery boiler fly ash, and/or by adding make-up NaOH.

Besides purging recovery boiler fly ash periodically, several fly ash treatment processes are presently available for selectively removing Cl and K from the recovery cycle, using different principles such as leaching (ALE), evaporation crystallization (ARC), freezing-crystallization and ion exchange. While the first three fly ash treatment processes employ different principles, they all follow a basic scheme. Fly ash and water are fed into an ash treatment unit where they are mixed and treated. The resulting slurry consists of two parts, a liquid and a solid. The liquid part, which is essentially the saturated solution of the fly ash, contains more Cl and K and less $SO_4^{2+}$ and $CO_3^{2+}$ than the solid part. These two parts are subsequently separated in a separation unit. The liquid stream is purged to remove Cl and K, while the solid stream is returned to the mill liquor to recover Na and S.

There exists a need to reduce the amount of make-up chemicals, and particularly sodium-containing make-up chemicals that need to be fed to a pulp mill.

There exists a need to better utilize the capacity of a sulphuric acid plant in order to prepare valuable side streams, such as tall oil production and lignin extraction.

There exists a need to reduce dumping of fly ash and to recycle it into the process.

SUMMARY OF THE INVENTION

The invention is defined by the features of the independent claims. Some specific embodiments are defined in the dependent claims.

According to a first aspect of the present invention, there is provided a method of replacing with sodium make-up chemicals sodium losses caused by outflows in a pulp mill which employs a kraft process for producing cellulosic pulp, wherein the pulp mill includes a unit for conversion of sulphurous compounds, which is fed with sulphurous substances of the kraft process to convert said sulphurous substances into oxidized sulphurous compounds, said method comprising using sodium sulphate possibly together with other sodium salts as the main make-up chemical, to achieve an essentially sodium hydroxide free feed of sodium make-up chemicals, and at least a part of the sulphur contained in the sodium sulphate make-up chemical being used for producing oxidized sulphurous coumpounds in said unit for conversion of sulphurous compounds.

According to a second aspect of the present invention, there is provided a method of producing bleached cellulosic pulp in a pulp mill employing a kraft process wherein: pulp is produced from a lignocellulosic raw material in a cooking stage using a cooking liquor comprising white liquor which is regenerated in a chemical recirculation of the pulp mill; and the pulp obtained from the cooking stage is subjected to a bleaching stage, which comprises at least one alkaline oxidizing step in order to produce bleached cellulosic pulp. The pulp mill further including a sulphuric acid plant which is being fed with sulphurous substances collected from the kraft process for producing sulphuric acid or alkali metal sesquisulphate or a combination thereof, at least a part of the regenerated white liquor is oxidized. The oxidized white liquor thus obtained is used as a medium in an alkaline oxidizing step of the bleaching, and sodium sulphate is used as main make-up chemical for replacing sodium losses, said sodium sulphate at least partially being fed into the chemical recirculation of the pulp mill for regenerating white liquor, and at least a part of the sulphur contained in the make-up chemical feed being used for producing sulphuric acid or alkali metal bisulphites or a combination thereof in the sulphuric acid plant.

According to a third aspect of the present invention, there is provided a system comprising a first pulp mill and a second pulp mill, configured to carry out the method according to the second aspect, wherein the make-up chemical originates from the first pulp mill and is fed to the second pulp mill to replace sodium losses therein.

Advantages of the Invention

An advantage of the present invention is that less make-up sodium hydroxide is needed to compensate for sodium losses.

An advantage of the present invention is that dumping of fly ash to the environment can be reduced.

An advantage of the present invention is that a larger amount of spent acid from the $ClO_2$ plant can be utilized internally, without having to lead the spent acid to a waste water treatment plant.

An advantage of the present invention is that a sulphuric acid plant of a pulp mill can be operated with a higher capacity, thus producing more sulphuric acid for internal uses as well as for external uses.

An advantage of the present invention is that less $CO_2$ is needed in tall oil production.

An advantage of the present invention is that less make-up NaOH needs to be used in the pulp mill, for example at an EOP bleaching stage.

An advantage of the present invention is that waste water pH adjustment can be carried out in a cost-effective way by feeding oxidized white liquor instead of NaOH in cases where lime (CaO) is not available.

BRIEF DESCRIPTION OF THE DRAWING

FIG. 1 is a process chart illustrating schematically the operation and organization of a pulp mill in accordance with at least some embodiments of the present invention.

EMBODIMENTS

Definitions

In the present context, the term "white liquor" refers to an alkaline cooking media comprising mainly NaOH and $Na_2S$ as the main delignification chemicals.

In the present context, the term "black liquor" comprises spent white liquor, which contains dissolved organic dry solids, water and dissolved inorganic dry solids.

In the present context, the term "non-process elements" comprises elements that are not essential to the kraft pulping process (such as Fe, Mn, Al, P, K, Cl). Although potassium (K) and chlorine (Cl) may take part in the process, they are generally also considered NPEs.

In the present context, the term "D0 stage" refers to the first $ClO_2$ bleaching step, and "D1 stage" refers to the second $ClO_2$ bleaching step.

In the present context, the term "EO stage" refers to a bleaching step (alkaline extraction) in which oxygen and NaOH but not peroxide is used.

In the present context, the term "EOP stage" refers to a bleaching step (alkaline extraction) in which both oxygen and peroxide in addition to NaOH are used.

In the present context, the term "make-up chemical" refers to chemicals that are used for replacing chemicals that are lost from the delignification, oxygen delignification and bleaching processes and/or from the chemical recovery processes due to outflows during normal operation of the process.

In the present context, the system boundaries for evaluating the chemical balance, such as Na/S balance, are positioned so that at least the digester, the oxygen delignification and bleaching sections, and the chemical recovery and recycling section are defined to be inside the system.

In the present invention, it has been surprisingly observed that the need to feed make-up sodium hydroxide can be significantly reduced in several steps of pulping. One of such steps is an oxidizing bleaching step, for example an EOP bleaching step, carried out at alkaline conditions. Another suitable step is an EO or E bleaching step.

The present invention provides a new method of controlling the Na/S balance of a pulp mill so that less NaOH-containing make-up chemicals are needed.

The method is applicable for example to a kraft process for producing bleached cellulosic pulp, which pulp mill includes a sulphuric acid plant, which is fed with non-condensable gases collected from off-gases of the kraft process to produce sulphuric acid. According to an embodiment, sodium sulphate possibly together with other sodium salts is used as the main make-up chemical, to achieve sodium hydroxide free feed of sodium make-up chemicals. At least a part of the sulphur contained in the sodium sulphate make-up chemical is used for producing sulphuric acid in the sulphuric acid plant. The produced sulphuric acid can be used inside the kraft pulp mill or alternatively outside it.

In one embodiment, pulp is produced in the cooking (delignification) stage of the kraft process in a cooking liquor comprising white liquor having a sulphidity of about 20 to 50%, in particular about 35 to 42%.

In one embodiment, pulp is prepared by a Kraft process that involves at least the following steps: cooking (delignification), oxygen delignification, and bleaching. Typically, sulphur-containing output streams are treated in a sulphuric acid plant to prepare sulphuric acid, which can be recirculated back to the process or led to external uses. Part of the white liquor is oxidized and used as an alkaline media (as a source of caustic soda) in the oxygen delignification step and/or bleaching. Thereby, input of make-up sodium hydroxide can be correspondingly reduced in this step. The reduced input of make-up sodium enables inputting of alternative chemicals containing sodium and/or sulphur, for example make-up sodium sulphate or make-up sodium carbonate into the process.

In one embodiment, the sodium sulphate and any other sodium salts, such as sodium carbonate, used as make-up chemical provide most or even all of the sodium needed to cover for losses in a pulp mill of the present kind. By this way, fresh feed of sodium hydroxide can, in practice, be avoided altogether, or at least greatly reduced.

In one embodiment, the make-up chemical feed is essentially sodium hydroxide free. In practice, the sodium losses of the pulp mill are replaced by make-up chemicals which contain less than 5 mole-%, in particular less than 2 mole-%, for example less than 0.5 mole-% sodium hydroxide.

Advantageously, the pulp mill includes a unit (or plant) for conversion of sulphurous compounds, which unit is fed with sulphurous substances of the kraft process to convert said sulphurous substances into oxidized sulphurous compounds. Said unit for conversion of sulphurous compounds can be a sulphuric acid plant.

In some embodiments, the oxidized sulphurous compounds are selected from the group of alkali metal bisulphites and sulphuric acid and $SO_2$ and combinations thereof.

Due to the use of, in particular, sodium sulphate, the proportion of sulphurous compounds in the process streams increases. Some of such compounds are vaporized during pulping and evaporation, and during recycling and regeneration of the used cooking liquor. At least part of the sulphurous gases are odorous gases which are non-condensable. Such gases collected from off-gases of the kraft process are collected and concentrated and used for the production of sulphuric acid in a sulphuric acid plant. Thus, through the non-condensable sulphurous gases, at least a part of the sulphur contained in the make-up chemical feed can be used for producing sulphuric acid in the sulphuric acid plant.

In some embodiments, sulphur-containing gases are liberated from black liquor via a heat treatment (LHT), or from green liquor via stripping of hydrogen sulphide (GLSS). These gases are treated to produce sulphur compounds that can be utilized internally or externally. Examples of such valuable sulphur compounds include sulphuric acid, sulphur dioxide ($SO_2$ water) and bisulphite compounds. Sodium bisulphite and sulphur dioxide (so-called "antichlor" chemicals) are a valuable chemicals as they can be used for eliminating residual $ClO_2$ from the final pulp product. Some mills add "antichlor" chemicals at the end of a chlorine dioxide tower to minimize the negative effects or large concentrations of residual chlorine dioxide.

Advantageously, such a sulphur compound is produced from sulphur containing off-gases of a mill which sulphur compound can be utilized either internally in the pulping process or externally in another mill's pulping process or sold for other uses. Sodium bisulphite and sulphur dioxide can be transported to another pulp mill and used there.

In a preferred embodiment, at least 10% of the make-up NaOH, preferably at least 50%, more preferably at least 90%, is replaced by another sodium-containing make-up chemical, for example sodium sulphate or waste acid from a $ClO_2$ plant. In one embodiment, sodium sulphate and any other sodium salts, such as sodium carbonate, make up for at least 80 mole-%, preferably at least 85 mole-%, in particular 90 to 100 mole-% of the sodium losses of the pulp mill.

In one embodiment, a majority of the sodium compounds used as make-up chemicals comprise sodium sulphate or sodium carbonate or mixtures thereof. Other sodium salts which have sufficient solubility can be used as well, although generally halides are preferably avoided in view of issues with corrosion.

The make-up chemicals can be used in pure or purified form, for example as purchased chemicals having a purity of more than 80% by weight, in particular 90% by weight or more.

The alternative make-up chemicals may originate from another pulp mill, such as fly ash from a recovery boiler of another pulp mill, waste acid from a $ClO_2$ plant of another pulp mill, or they may be of commercial origin, such as commercially obtained sodium sulphate and/or sodium carbonate. The advantage of these chemicals is that they are less expensive than sodium hydroxide. In this way it is possible to control and optimize costs related to chemicals that are needed during pulp mill operation.

In one embodiment, the alternative make-up chemicals replacing NaOH make-up chemical partly or entirely originate from a source that is external to the pulp mill into which the make-up chemicals are fed, such as another pulp mill. In one embodiment, the invention provides a system comprising said two pulp mills. In one embodiment, said alternative make-up chemicals comprise or consist of sodium sulphate of commercial origin and they make up at least 50 mole-% of the sodium losses of the pulp mill. In another embodiment, said alternative make-up chemicals comprise or consist of waste acid and/or fly ash from another pulp mill.

If the alternative make-up chemical contains not only sodium but also sulphur, it becomes possible to increase the utilization of an internal sulphuric acid plant by leading sulphur-containing outflows to the plant for regeneration.

The advantage of using another sodium-containing chemical, which does not have to be sulphur-free, is that there are more alternatives to choose from: for example sodium sulphate, sodium carbonate, waste acid and fly ash. These alternatives may be significantly cheaper than NaOH.

They may also contribute to further closure of the chemical cycle and thus reduce the amount of effluents led to the environment or landfills.

In a particular embodiment, at least a part of the sodium salts used as make-up chemicals are provided in the form of by-products and residues of a pulp mill. For example, the sulphurous by-products and sulphurous residues are selected from the group of sulphurous ashes, such as recovery boiler fly ash, and filtration cakes, such as salt cake of a chlorine dioxide plant, and combinations thereof. Some of these products and residues can originate from another pulp mill.

In some embodiments, the invention provides a system comprising a first pulp mill and a second pulp mill. The make-up chemical originates from the first pulp mill and is fed to the second pulp mill to replace sodium losses therein. The make-up chemical for replacing sodium losses in the second pulp mill comprises sodium sulphate or a mixture of sodium sulphate and sodium carbonate, obtained as by-products and residues of the first pulp mill and/or the second pulp mill.

Preferably, in the second pulp mill at least a part of the regenerated white liquor is oxidized, and the oxidized or partly oxidized white liquor thus obtained is used as a medium in an E, EO and/or EOP step of the bleaching, preferably in an EO step of the bleaching.

Preferably, the second pulp mill comprises a sulphuric acid plant. Even more preferably, the second pulp mill also comprises a fly ash treatment unit for selectively removing Cl and K from the recovery cycle.

By using chemical compositions recovered from an industrial process, such as a pulp mill, the cost of the make-up chemicals can be greatly reduced. In addition, surprisingly it has been found that although there basically is a risk of some accumulation of other non-process elements due to the use of by-products and recycling streams, by available technology NPE compounds can be properly removed from the process streams and further accumulation can be avoided, as will be discussed below.

Typically, a sulphuric acid plant connected to a pulp mill cannot be operated at a high capacity. The amount of sulphuric acid generated is usually in the range 0 to 15 kg/ADt (Air Dry ton). The input stream of the sulphuric acid plant may be composed of the odorous gases (non-condensable gases, NCGs) generated in the chemical cycle, mostly in the evaporation plant. NCGs do not contain sodium, making them a straightforward way to control Na/S balance in a situation of excess sulphur. The input stream may comprise sulphurous gases produced in an LHT process or a GLSS process or like.

In some embodiments, the input stream of a sulphuric acid plant comprises one or more of the following list: CNCG (concentrated non-condensable gases), CNCG from cooking, CNCG from evaporation vacuum system, CNCG from pressurized BL storage, CNCG from methanol liquefaction, CNCG from LHT, CNCG from Methanol Purification, SOG (stripper off-gases), liquefied MeOH (unpurified), gases from green liquor stripping.

In the present invention, the presence of a sulphuric acid plant is advantageous, as it enables an efficient control of the Na/S balance in a situation where the use of sulphur-containing make-up chemicals is increased. The amount of sulphuric acid generated by the plant can be increased to a level of 30 kg $H_2SO_4$/ADt or higher by using the present invention.

The present invention makes it possible to avoid or reduce dumping of recovery boiler fly ash and chlorine dioxide ($ClO_2$) plant waste acid. Such dumping is typically used for getting rid of accumulated sulphur in the process; however, simultaneously sodium loss takes place, as the ash also contains sodium compounds.

While the sulphuric acid plant solves the excess sulphur problem, the black liquor may contain high levels of non-process elements which disturb the chemical recovery process. These non-process elements originate from wood (raw material), water, make-up chemicals or filtrate coming from bleaching. Therefore, in the present invention the mill preferably includes a system for removing non-process elements, such as chlorine and potassium, from the chemical cycle, particularly if the alternative make-up chemical is fly ash from the same or from another pulp mill, or any other output stream in which the level of non-process elements is high. Fly ash may contain substantial amounts of chlorine and potassium.

Various processes to remove NPEs from the chemical cycle are known. Such processes can be used if the Cl or K levels in the recovery boiler are too high. Such a situation may arise when the raw material (wood), make-up chemicals, water and/or filtrate returned from bleaching contain a high amount of Cl and/or K. The use of a portion of the filtrate from ECF bleaching in post oxygen washing after oxygen delignification or in brown stock washing after delignification increases particularly the Cl content in the chemical recovery cycle. Typically, the amount of Cl may not exceed 2 weight-% and the amount of K may not exceed 3 weight-% in the recovery boiler fly ash as an example. These values depend on the materials of the recovery boiler, and the pressure and temperature used.

In some embodiments, Cl and K are removed from the recovery cycle by any one of the following methods: leaching (ALE), evaporation crystallization (ARC), freezing-crystallization, or ion exchange.

The present invention makes it also possible to input fly ash produced in another pulp mill by utilizing an ARC or ALE removal system for NPEs, particularly if the ash contains high amounts of Cl and/or K.

Exemplary systems for removing NPEs are an Ash Re-Crystallization system (ARC) or an Ash Leaching system (ALE) supplied by Andritz.

In the ARC process, the ash is completely dissolved in clean condensate (or another calcium-free water source). After dissolving, the ash solution is pumped to a crystallizer where water is evaporated until sodium sulphate and sodium carbonate precipitate from the solution. Precipitated crystals are sent to a thickener and separated for example with a pusher centrifuge. Most of the separated liquid is recirculated to the crystallizer to minimize sodium losses. The remaining liquid is purged to remove dissolved chloride and potassium from the chemical cycle.

In ash leaching (ALE), the ESP ash is partially dissolved in hot secondary condensate from the evaporators. After partially dissolving, the solids and liquid are separated using a centrifuge. The solids consist mainly of sodium sulphate and sodium carbonate while the filtrate is rich in chloride and potassium. After separation, the solids are mixed with heavy black liquor. A part of the liquid fraction is purged from the system to remove Cl and K. The rest of the filtrate is recycled to the leaching tank in order to prevent excess dissolution of sodium from the ESP ash.

In one embodiment, the mill includes a tall oil plant. The tall oil plant receives its intake, tall oil soap, from the cooking and/or evaporation plant where tall oil soap is separated from black liquor. The soap needs to be separated, as it disturbs the operation of the evaporation plant and in addition it is a valuable side stream. Make-up sulphuric acid, for example from the sulphuric acid plant, is added in order to prepare crude tall oil from the tall oil soap. One way to reduce the amount of make-up sulphuric acid is to use make-up carbon dioxide for acidulation of the tall oil soap. However, the $CO_2$-based process is not very effective, and a certain amount of sulphuric acid must still be input together with $CO_2$. The advantage of using the present invention is that the input of $CO_2$ can be dispensed with or at least reduced.

According to a preferred embodiment, a part of the filtrate from a bleaching step, preferably from an E, EO, EOP, P or PO bleaching step, may be returned to a washing step of the oxygen delignification stage.

In one embodiment, a part of the filtrate from a bleaching step, preferably from an EO bleaching step, is returned to the chemical cycle. In this way Na can be returned to the chemical cycle. Preferably the pulp mill in this case comprises a unit for selectively removing non-process elements, such as Cl and K, from the chemical recovery cycle.

According to some embodiments, at least part of the sulphuric acid that has been produced from the sulphur intake originating from make-up sodium sulphate and/or make-up fly ash is used for separation of tall oil soap from black liquor, in particular by acidulation.

A product of the present invention is preferably a bleached pulp, such as bleached Kraft pulp.

The present technology is particularly well suited to the production of bleached kraft pulp. The bleaching can be carried out by conventional elemental chlorine free bleaching (ECF) or by totally chlorine free bleaching (TCF). The bleaching chemicals are typically selected from chlorine dioxide, oxygen gas, hydrogen peroxides and peroxide compounds, sulphuric acid, ozone and combinations thereof. Typically, an oxygen delignification stage is first carried out after cooking (delignification) to remove a majority of lignin remaining after cooking. After oxygen delignification, washing is carried out.

In alkaline processing steps, the pH in the bleaching steps is typically in the range 9 to 11, for example 9.5 to 10.0. In acid processing steps, the pH in the bleaching (final pH) is typically about 2 to 5.5, for example 3 to 4.5. In one embodiment, the pulp obtained from the pulping stage is subjected to totally chlorine free bleaching, using for example ozone, peroxide, oxygen or a combination thereof, and preferably including at least one alkaline oxidizing step.

In one embodiment, bleaching is carried out at normal atmospheric pressure. In another embodiment, bleaching is carried out at an overpressure, which typically is about 1.05 to 10 times normal atmospheric pressure.

In one embodiment, the pulp obtained from the oxygen delignification stage is subjected to chlorine dioxide bleaching stage which comprises at least a first chlorine dioxide step carried out at acidic pH, a second chlorine dioxide step carried out at acidic pH, and an intermediate alkaline oxidizing step carried out between the first and the second chlorine dioxide steps.

The first chlorine dioxide stage (D0 stage) may need acid for pH adjustment, and input of sulphuric acid is needed.

A so-called 'A' stage may follow after oxygen delignification stage and before D stage. Sulphuric acid input is needed also in the A stage.

In one embodiment, the oxidizing step of the chlorine dioxide bleaching is carried out in an alkaline medium at an end pH of 9 to 11 in the presence of an oxidizing agent selected from the group of oxygen gas and peroxide and combinations thereof.

For the alkaline stage, any alkaline agent can be used for adjusting the end pH to a range of about 9 to 11. In one preferred embodiment, at least a part of the white liquor regenerated in the chemical recovery circulation of the pulp mill is oxidized and used as an alkaline agent in the alkaline oxidization step of the chlorine dioxide process.

In one embodiment, at least 50 mole-%, in particular at least 75 mole-% of the alkaline agent of the alkaline medium of the oxidizing step of the chlorine dioxide bleaching is comprised of oxidized white liquor.

In one embodiment, at least a part of the regenerated white liquor is oxidized, and the oxidized or partly oxidized white liquor thus obtained is used as a medium in an alkaline oxidizing step of the bleaching, which step is preferably an EO step. More preferably, at the same time at least 10% of the make-up NaOH, preferably at least 50%, more preferably at least 90%, is replaced by another sodium-containing make-up chemical which comprises or consists of sodium sulphate originating from an external source, i.e. from outside the pulp mill. The advantage of using the above presented processes (use of oxidized white liquor and use of external sodium sulphate as a make-up chemical) in the pulp mill is that the Na/S balance of the pulp mill can be controlled effectively and economically.

In one embodiment, at least a part of the regenerated white liquor is partly or totally oxidized, and the oxidized or partly oxidized white liquor thus obtained is used as a medium in an alkaline oxidizing step of the bleaching, which step is preferably an EO step. In preferred embodiments, said oxidized or partly oxidized white liquor is also used for adjusting the pH of an effluent stream in the pulp mill. Even more preferably, at the same time at least 10% of the make-up NaOH, preferably at least 50%, more preferably at least 90%, is replaced by another sodium-containing make-up chemical which comprises or consists of sodium sulphate originating from an internal or external source. The advantage of using all of the above presented processes (use of oxidized white liquor and use of external or internal sodium sulphate as a make-up chemical) in the pulp mill is that the Na/S balance of the pulp mill can be controlled effectively and economically.

In one embodiment, at least a part of the regenerated white liquor is partly or totally oxidized, and the oxidized or partly oxidized white liquor thus obtained is used as a medium in an alkaline oxidizing step of the bleaching, which step is preferably an EO step. As the NaOH content of the oxidized white liquor is rather low, said process of using oxidized white liquor is advantageously combined with using sodium sulphate which has been obtained in the form of by-products and residues of a pulp mill as the make-up chemical for replacing sodium losses.

The effluent of the alkaline, oxidizing bleaching step can be discarded. However, preferably at least a part of the effluent is recovered and recirculated. In one embodiment, at least 50% by weight, of the effluent of the alkaline oxidization step is recirculated to the chemical recirculation of the pulp mill for regenerating white liquor.

Further, one embodiment of the present technology comprises a method of producing bleached cellulosic pulp in a pulp mill employing a kraft process, wherein
  pulp is produced from a lignocellulosic raw material in a delignification (cooking) stage using a cooking liquor comprising white liquor which is regenerated in a chemical recirculation of the pulp mill; and
  the pulp obtained from the delignification (cooking) stage is subjected to bleaching.

In some embodiments of the above process, the bleaching sequence is either ECF bleaching or TCF bleaching.

In one embodiment, the sodium sulphate and possibly other sodium salts used as main make-up chemical for replacing sodium losses, are being fed into the chemical recirculation of the pulp mill for regenerating white liquor.

Thus, in one embodiment, the present technology provides for a method of generating sodium hydroxide by the conventional chemical recovery recirculation of the pulp mill for use not only in the delignification liquor, i.e. the white liquor, but also in other processes where alkaline conditions are observed.

Preferably, at least a part of the regenerated white liquor is oxidized, and the oxidized white liquor thus obtained is used as a medium in an alkaline oxidizing step of the chlorine dioxide bleaching (ECF) or TCF bleaching. Further, sodium sulphate is used as main make-up chemical for replacing sodium losses, the sodium sulphate being least partially fed into the chemical recirculation of the pulp mill for regenerating white liquor.

In some embodiments, at least a part of the regenerated white liquor is oxidized, and the oxidized white liquor thus obtained is used as a medium in an alkaline oxidizing step of a bleaching process, which may be for example an ECF bleaching process or a TCF bleaching process, to replace at least a part of the NaOH that is used as a bleaching agent, or for pH adjustment.

Oxidized white liquor may be used in any pulping or recovery step that requires pH adjustment. Oxidized white liquor may also be output and transported to another pulp mill, to be used there, particularly if the receiving mill does not include an NPE removal system but the sending mill does.

In preferred embodiments, the wood that is used as a raw material in the method comprises softwood, such as pine or spruce, or hardwood, such as birch, aspen, poplar, alder, maple, Cottonwood, or eucalyptus or others, including mixed tropical hardwood. However, also other raw-materials may come into question, such as annular and perennial plant materials, such as straw of grain crops, reed canary grass and bagasse.

In an advantageous embodiment, the make-up chemical for replacing sodium losses comprises or consists of sodium sulphate or a mixture of sodium sulphate and sodium carbonate, obtained as either internal or external by-products and residues of a pulp mill. Further, at least a part of the regenerated white liquor is oxidized, and the oxidized or partly oxidized white liquor thus obtained is used as a medium in an EO step of the bleaching. Additionally, a part of the filtrate from an EO bleaching step is returned to the chemical cycle. In this embodiment, the pulp mill preferably comprises a sulphuric acid plant and a unit for selectively removing non-process elements, such as Cl and K, from the recovery cycle. In this embodiment the functioning of the fibre line and the functioning of the recovery line provide synergy and an efficient way to control the Na/S balance of the pulp mill.

Turning now to the attached drawing, it can be noted that FIG. 1 illustrates schematically the operation and organization of a pulp mill in accordance with at least some embodiments of the present invention.

The mill is generally divided into a fibre line and a recovery line. In the fibre line, wood raw material is converted to pulp. In the recovery line, the cooking media and chemicals of the chemical cycle are treated and circulated. Also the energy contained in wood material is recovered.

The wood raw material is typically softwood, for example pine or spruce, or hardwood, for example birch, although other raw-materials can be used as well, as discussed above. The process of the fibre line begins with peeling and chipping 2 of the wood, collecting the wood chips into piles 3, screening 4 of the wood chips, and then leading the screened chips to the digester 5. The bark obtained is dried 1 and then gasified for a lime kiln.

In the digester 5, the chips are delignified in alkaline white liquor in order to remove lignin while keeping the fibres as intact as possible. The delignified chips are washed and screened 6. Oxygen delignification 7 and bleaching steps 8 follow thereafter. The chemicals that may be used in the delignification and bleaching steps include $MgSO_4$, sulphuric acid, hydrogen peroxide, oxygen, NaOH, and $ClO_2$. Oxidized white liquor may be used in all or some of these steps. Sulphuric acid produced in the sulphuric acid plant 11 can be conducted to the bleaching step 8.

The bleached pulp is dried 9, baled 10, and then delivered to the customers.

In the recovery line, the spent white liquor (black liquor) from the digester is led to an evaporation plant 12, from which the concentrated black liquor (heavy black liquor) goes to the recovery boiler 16. The recovery boiler generates solids (smelt), which are led to a regeneration cycle composed of a recausticizing unit 15 and a lime kiln 14. The smelt is mixed with weak white liquor to prepare so called green liquor, and treated in the recausticizing unit to produce white liquor, which contains the alkaline cooking chemicals and from which lime mud is separated. The lime kiln then burns the lime mud to burned lime for reuse. Lignin may be separated in unit 22 from the black liquor by acidification, for example by using sulphuric acid (for example from unit 11) and washed, then returning lignin wash liquids back to the evaporation 12.

Condensate from the evaporation plant 12 can be conducted to the bleaching step 8 and/or to a washing step of the oxygen delignification 7.

Advantageously, part of the regenerated white liquor is not led to the digester 5 but to the oxygen delignification 7 and/or bleaching steps 8 to serve as a replacement of make-up NaOH. This side stream is oxidized.

The recovery boiler 16 also outputs fly ash and steam. Fly ash may be dumped, returned directly to the chemical cycle, or first treated to remove Cl and/or K and then returned to the chemical cycle. The hot steam produced in the recovery boiler 16 is mostly led to the turbine 17 to supply back-pressure steam and to generate electricity, which can be used by the mill itself or externally. Flue gases generated in the recovery boiler 16 and the lime kiln 14 are filtered by means of electrical precipitators 19 and 18. Ash from the precipitator 19 is led both to the evaporator 12 and to an NPE removal system (25, here also referred to as "ARC").

Concentrated sulphur-containing odorous gases originating from the evaporation plant 12 or the digester 5 or the recausticizing 15 are led either to the recovery boiler 16, to the lime kiln 14, or to the sulphuric acid plant 11. Weak odorous gases 20 are led to the boiler.

GLSS (green liquor simplified stripping) products from the recausticizing unit 15 can be led to the sulphuric acid plant 11.

The mill includes a biological wastewater treatment plant 21.

The $ClO_2$ plant 24 uses $NaClO_3$ and sulphuric acid (from the sulphuric acid plant) among others as raw materials. The plant produces $ClO_2$, which is led to the bleaching step 8, and waste acid, which contains sodium sulphate or sesquisulphate. The waste acid is led to the evaporation plant 12.

The mill includes a tall oil plant 13. The tall oil plant receives tall oil soap from the cooking and/or evaporation plant 12 and sulphuric acid from the sulphuric acid plant 11. Mother liquor (brine) from the tall oil production process contains sulphur compounds. It is led back to the evaporation plant, which means that more sulphur is incorporated into the heavy black liquor and thereby into the chemical cycle.

In the embodiment of FIG. 1, make-up sodium sulphate is input to the evaporator 12. If fly ash from another pulp mill is used as a sodium-containing make-up chemical, it is preferable to input the fly ash directly to the ARC 25, because the ash may contain NPEs. Alternatively, the fly ash from another pulp mill can be input to the evaporator 12. Effluents from the ARC 25 are led to the biological wastewater treatment plant 21. Na and S containing waste from another pulp mill or from other external sources, such as metal industry or chemical industry, can be led to the ARC 25 or to the evaporator 12.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The present invention is industrially applicable at least in the manufacturing of pulp, in particular bleached pulp.

Acronyms List

NPE non-process element
ECF elemental chlorine free
TCF totally chlorine free
LHT liquor heat treatment
GLSS green liquor simplified stripping
ESP electrostatic precipitator
LCHV low concentration high volume

REFERENCE SIGNS LIST

1. Drying of bark
2. Barking and chipping
3. Chip heaps
4. Chip screening
5. Cooking (delignification)
6. Washing, screening
7. Oxygen delignification
8. Bleaching
9. Drying
10. Baling
11. Sulphuric acid plant
12. Evaporation plant
13. Tall oil cooking
14. Lime kiln
15. Recausticizing
16. Recovery boiler
17. Turbine, generator
18. Electrostatic precipitators (ESP) of lime kiln
19. Electrostatic precipitators (ESP) of recovery boiler
20. Dilute odorous gases, LCHV gases
21. Biological waste water treatment plant
22. Lignin separation
24. $ClO_2$ plant
25. ARC (NPE removal system)

The invention claimed is:

1. A method of replacing with sodium make-up chemicals sodium losses caused by outflows in a pulp mill which employs a kraft process for producing cellulosic pulp, wherein the pulp mill includes a unit for conversion of sulphurous compounds, which is fed with sulphurous substances of the kraft process to convert said sulphurous substances into oxidized sulphurous compounds, said method comprising:

using sodium sulphate together with other sodium salts to achieve an essentially sodium hydroxide-free feed of sodium make-up chemicals, wherein at least a part of the sulphur contained in the sodium make-up chemicals is used for producing oxidized sulphurous compounds in said unit for conversion of sulphurous compounds and, wherein a majority of the other sodium salts comprises sodium carbonate.

2. The method according to claim 1, wherein the plant for conversion of sulphurous compounds comprises a sulphuric acid plant which is fed with sulphurous substances selected from the group consisting of non-condensable gases of the kraft process.

3. The method according to claim 1, wherein the oxidized sulphurous compounds are selected from the group consisting of alkali metal bisulphites, sulphuric acid, $SO_2$, and combinations thereof.

4. The method according to claim 1, wherein the sodium sulphate, and any other sodium salts used as the sodium make-up chemicals, make up for at least 80 mole-% of the sodium losses of the pulp mill.

5. The method according to claim 1, wherein at least a majority of the sodium make-up chemicals comprise sodium sulphate, sodium carbonate, or mixtures thereof.

6. The method according to claim 1, wherein at least a part of the other sodium salts are provided in the form of by-products and residues of a pulp mill.

7. The method according to claim 1, wherein the sodium make-up chemicals are provided in the form of by-products and residues of another pulp mill.

8. The method according to claim 1, wherein the sodium losses of the pulp mill are replaced by the sodium make-up chemicals, and wherein the sodium make-up chemicals comprise less than 5 mole-% sodium hydroxide.

9. The method according to claim 1, wherein:
pulp is produced in a cooking stage using a cooking liquor comprising white liquor which is regenerated in a chemical recirculation of the pulp mill,
at least a part of the regenerated white liquor is oxidized, and
the oxidized white liquor thus obtained is used as an alkaline agent in an alkaline stream of the pulp mill to at least partially replace a fresh feed of alkaline agent.

10. The method according to claim 9, wherein the oxidized white liquor is used as such as an alkaline medium of an alkaline stream in the pulp mill, or it is used for adjusting the pH of a stream in the pulp mill, including effluents thereof.

11. The method according to claim 9, wherein the oxidized white liquor is used as such as an alkaline medium of an alkaline stream of bleaching, or it is used for adjusting the pH of an effluent of bleaching.

12. The method according to claim 1, wherein:
the sodium sulphate is used as main make-up chemical for replacing sodium losses in the pulp mill, the sodium sulphate at least partially being fed into a chemical recirculation of the pulp mill for regenerating white liquor.

13. The method according to claim 9, wherein an effluent of the oxidizing step is recovered and at least partially recirculated in the chemical recirculation of the pulp mill.

14. The method according to claim 9, wherein sulphuric acid produced in the sulphuric acid plant is used for adjusting the pH of the first and the second chlorine dioxide bleaching steps and/or the sulphuric acid produced in the sulphuric acid plant is used for acidulation of crude tall oil soap, separated from black liquor.

15. A method of producing bleached cellulosic pulp in a pulp mill employing a kraft process, the method comprising:
producing pulp from a lignocellulosic raw material in a cooking stage using a cooking liquor comprising white liquor which is regenerated in a chemical recirculation of the pulp mill; and
subjecting the pulp obtained from the cooking stage to a bleaching stage, which comprises at least one alkaline oxidizing step in order to produce bleached cellulosic pulp;
feeding sulphurous substances collected from the kraft process to a sulphuric acid plant, for producing sulphuric acid or alkali metal sesquisulphate or a combination thereof;
oxidizing at least a part of the regenerated white liquor, using the obtained oxidized white liquor as a medium in an alkaline oxidizing step of the bleaching stage; and
using sodium sulphate together with other sodium salt as a main make-up chemical feed for replacing sodium losses, said sulphate at least partially being used for producing sulphuric acid or alkali metal bisulphites or a combination thereof in the sulphuric acid plant, and wherein a majority of the other sodium salts comprises sodium carbonate.

16. The method according to claim 15 wherein the oxidizing step is carried out in an alkaline medium at a pH of 10 to 14 in the presence of an oxidizing agent selected from the group of oxygen gas, peroxide, and combinations thereof.

17. The method according to claim 15, wherein the sodium sulphate used as make-up chemical comprises at least partially, sodium sulphate or a mixture of sodium sulphate and sodium carbonate, obtained as a by-products and residues of a pulp mill.

18. The method according to claim 15, wherein the make-up chemical for replacing sodium losses comprises or consists of sodium sulphate or a mixture of sodium sulphate and sodium carbonate, obtained as by-products and residues of a pulp mill.

19. The method according to claim 15, further comprising:
the make-up chemical for replacing sodium losses comprises sodium sulphate or a mixture of sodium sulphate and sodium carbonate, obtained as by-products and residues of a pulp mill;
at least a part of the regenerated white liquor is oxidized, and the oxidized or partly oxidized white liquor thus obtained is used as a medium in an EO step of the bleaching; and
a part of the filtrate from an EO bleaching step is returned to the chemical cycle.

20. A system comprising a first pulp mill and a second pulp mill, configured to carry out the method according to claim 18, wherein the make-up chemical originates from the first pulp mill and is fed to the second pulp mill to replace sodium losses therein.

* * * * *